(12) United States Patent
Kingsley

(10) Patent No.: US 10,697,433 B2
(45) Date of Patent: Jun. 30, 2020

(54) INEXPENSIVE HYDROGEN FROM WIND AND WATER USING AEROSTATS AND ELECTROLYSIS

(71) Applicant: Gordon Bruce Kingsley, Granite Bay, CA (US)

(72) Inventor: Gordon Bruce Kingsley, Granite Bay, CA (US)

(73) Assignee: Gordon Bruce Kingsley, Granite Bay, CA (US)

( * ) Notice: Subject to any disclaimer, the term of this patent is extended or adjusted under 35 U.S.C. 154(b) by 48 days.

(21) Appl. No.: 15/971,315

(22) Filed: May 4, 2018

(65) Prior Publication Data
US 2018/0320277 A1 Nov. 8, 2018

Related U.S. Application Data

(60) Provisional application No. 62/501,583, filed on May 4, 2017.

(51) Int. Cl.
| | |
|---|---|
| *F03D 9/19* | (2016.01) |
| *C25B 9/04* | (2006.01) |
| *F03D 5/02* | (2006.01) |
| *F03D 9/25* | (2016.01) |
| *F03D 13/25* | (2016.01) |
| *H02K 7/18* | (2006.01) |
| *C25B 1/04* | (2006.01) |
| *F03D 15/00* | (2016.01) |
| *F03D 5/00* | (2006.01) |
| *F03D 5/04* | (2006.01) |

(52) U.S. Cl.
CPC .............. *F03D 9/19* (2016.05); *C25B 1/04* (2013.01); *C25B 9/04* (2013.01); *F03D 5/00* (2013.01); *F03D 5/02* (2013.01); *F03D 5/04* (2013.01); *F03D 9/25* (2016.05); *F03D 13/25* (2016.05); *F03D 15/00* (2016.05); *H02K 7/183* (2013.01); *F05B 2220/61* (2013.01); *F05B 2220/706* (2013.01); *F05B 2240/922* (2013.01)

(58) Field of Classification Search
CPC .............. F03D 9/19; F03D 5/04; F03D 9/25
USPC .................................................. 290/55
See application file for complete search history.

(56) References Cited

U.S. PATENT DOCUMENTS

| | | | | |
|---|---|---|---|---|
| 2003/0066934 | A1* | 4/2003 | Bolonkin | F03D 5/00 244/153 R |
| 2012/0049533 | A1* | 3/2012 | Kelly | F03D 5/04 290/55 |
| 2012/0068471 | A1* | 3/2012 | Robertson | F03D 9/00 290/1 A |
| 2013/0307274 | A1* | 11/2013 | Sia | F03D 5/00 290/55 |
| 2015/0377211 | A1* | 12/2015 | Occhiello | C01C 1/02 518/704 |

* cited by examiner

Primary Examiner — Nicholas A Smith

(57) ABSTRACT

A renewable wind energy system to produce inexpensive electrical power and hydrogen is disclosed. Aerostats, towers, wind energy capture and transmission to ground mounted generators produce electrical power a portion of which is used for electrolysis of water to produce hydrogen and oxygen. Oxygen is sold as a byproduct. The combined system produces inexpensive hydrogen competitive with fossil fuels.

4 Claims, 9 Drawing Sheets

Block Diagram Wind Energy Conversion System (WECS)

Process Schematic Wind
Energy Conversion System
(WECS)

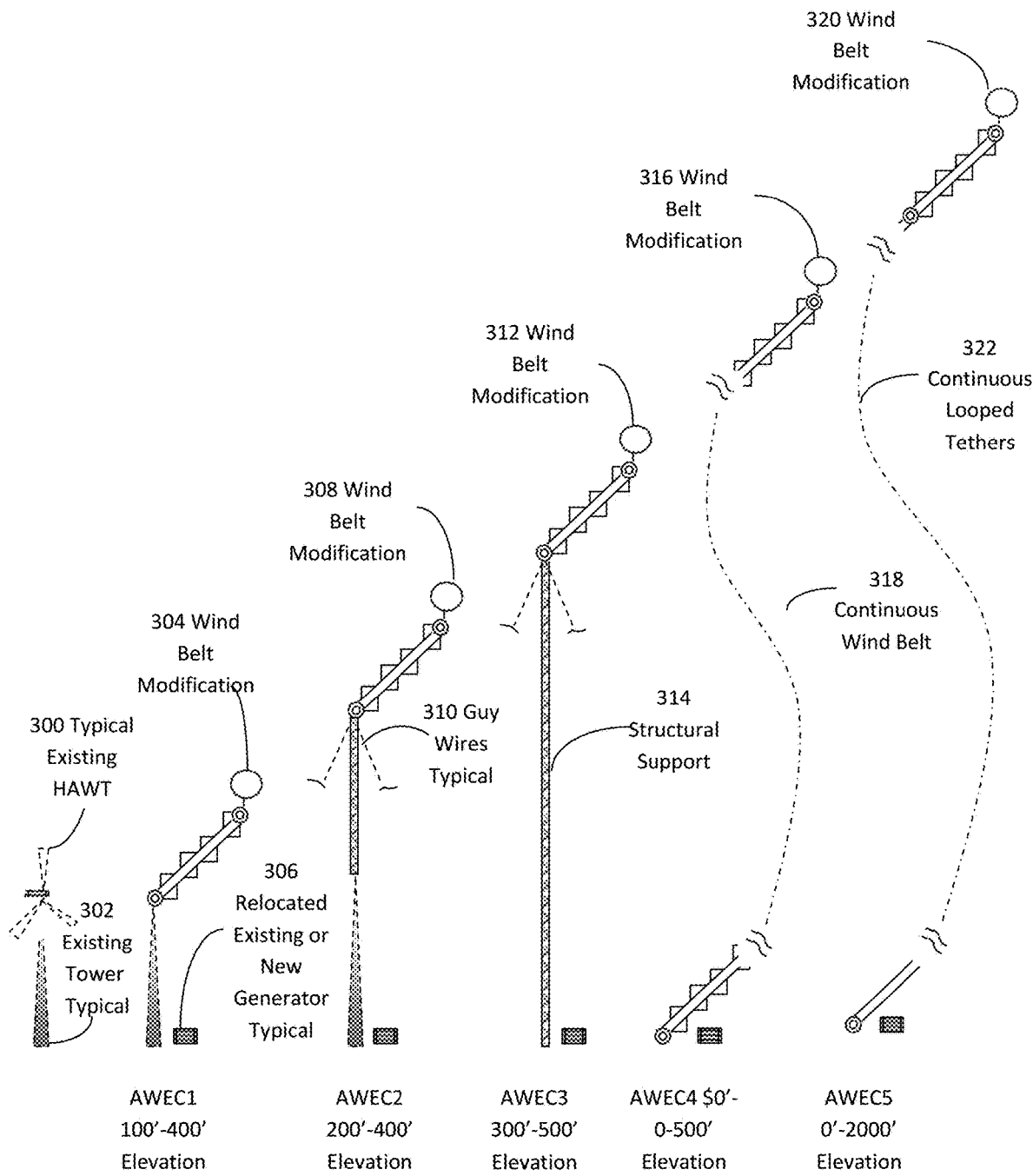
Figure 3 Various Configurations to Access Greater Heights Compared to Typical HAWT Revolving Motion High Altitude Wind Power Capture Systems Using Tethered Aerostat to Support Wind Capture Belt Revolving Motion High Altitude Wind Power Capture Systems Using Aerostat to Support Wind Capture Blades Tethered to Ground Mounted Generator

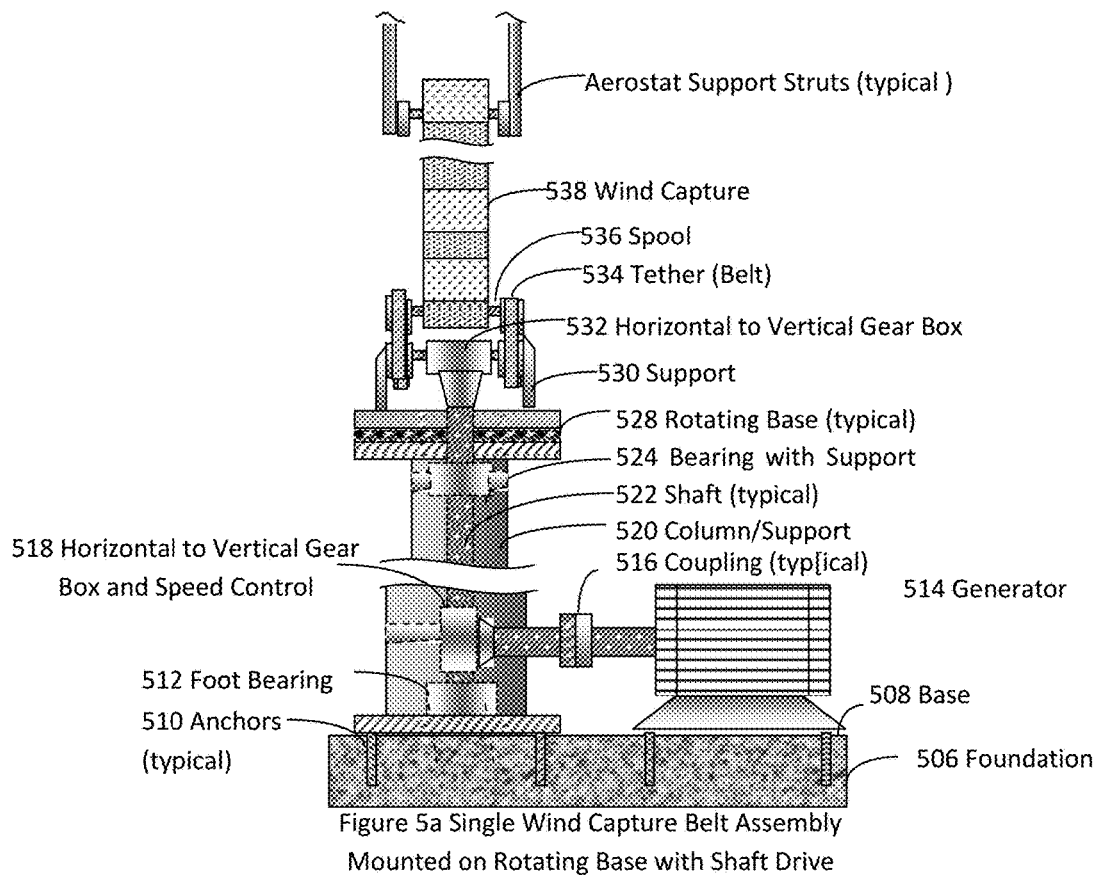
Figure 5a Single Wind Capture Belt Assembly Mounted on Rotating Base with Shaft Drive
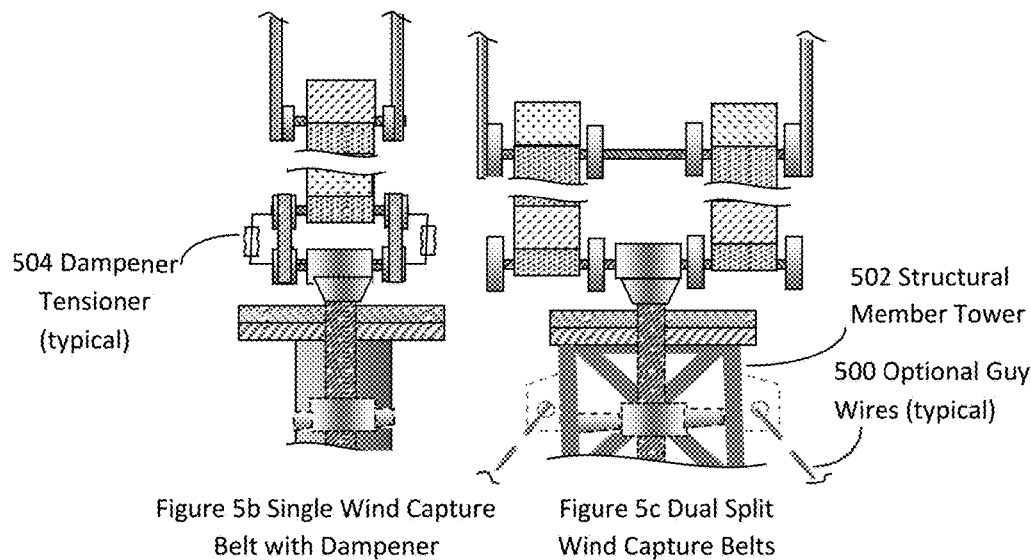
Figure 5b Single Wind Capture Belt with Dampener
Figure 5c Dual Split Wind Capture Belts
Figure 5 Details Additions and Modifications Conversion of HAWE to Wind Belt System Utilizing Shaft

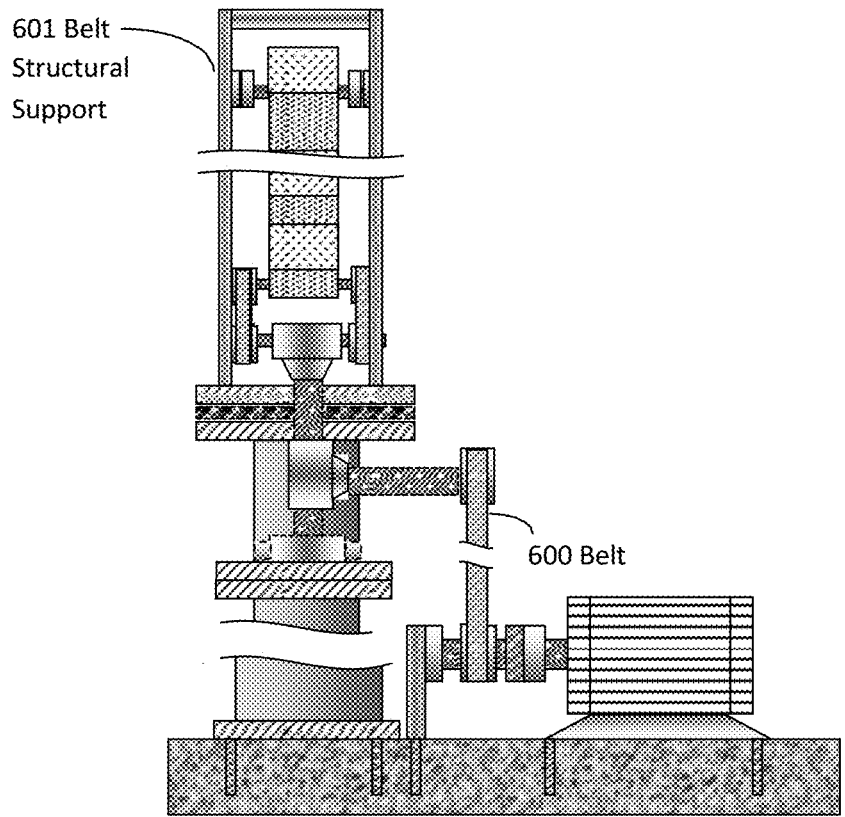
Figure 6a Single Wind Capture Belt with Structural Support Mounted to Column with Rotating Base
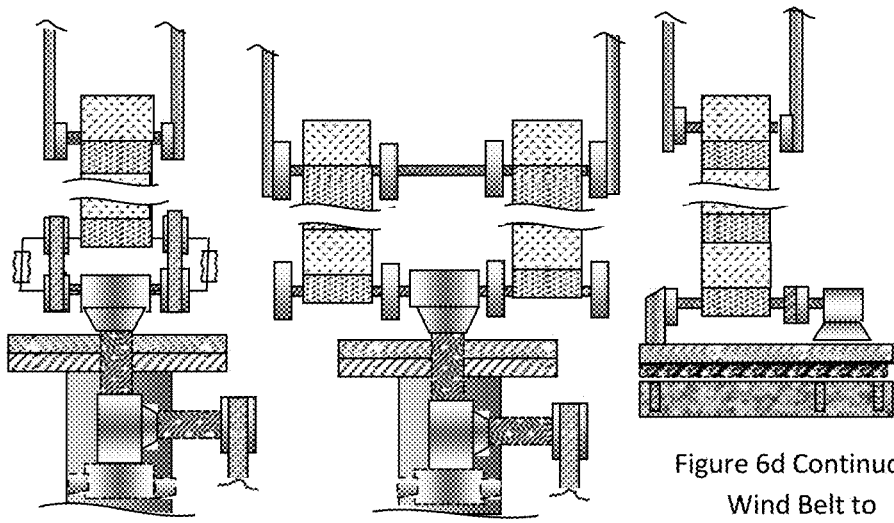
Figure 6b Single Wind Capture Belt
Figure 6c Dual Split Wind Capture Belts
Figure 6d Continuous Wind Belt to Horizontal Generator on Rotating Base
Figure 6 Details Additions and Modifications Conversion of HAWE to Wind Belt System Utilizing Belts Linear Motion HAWE Capture
System Using Inflated Single 'C' Kite
Aerostat

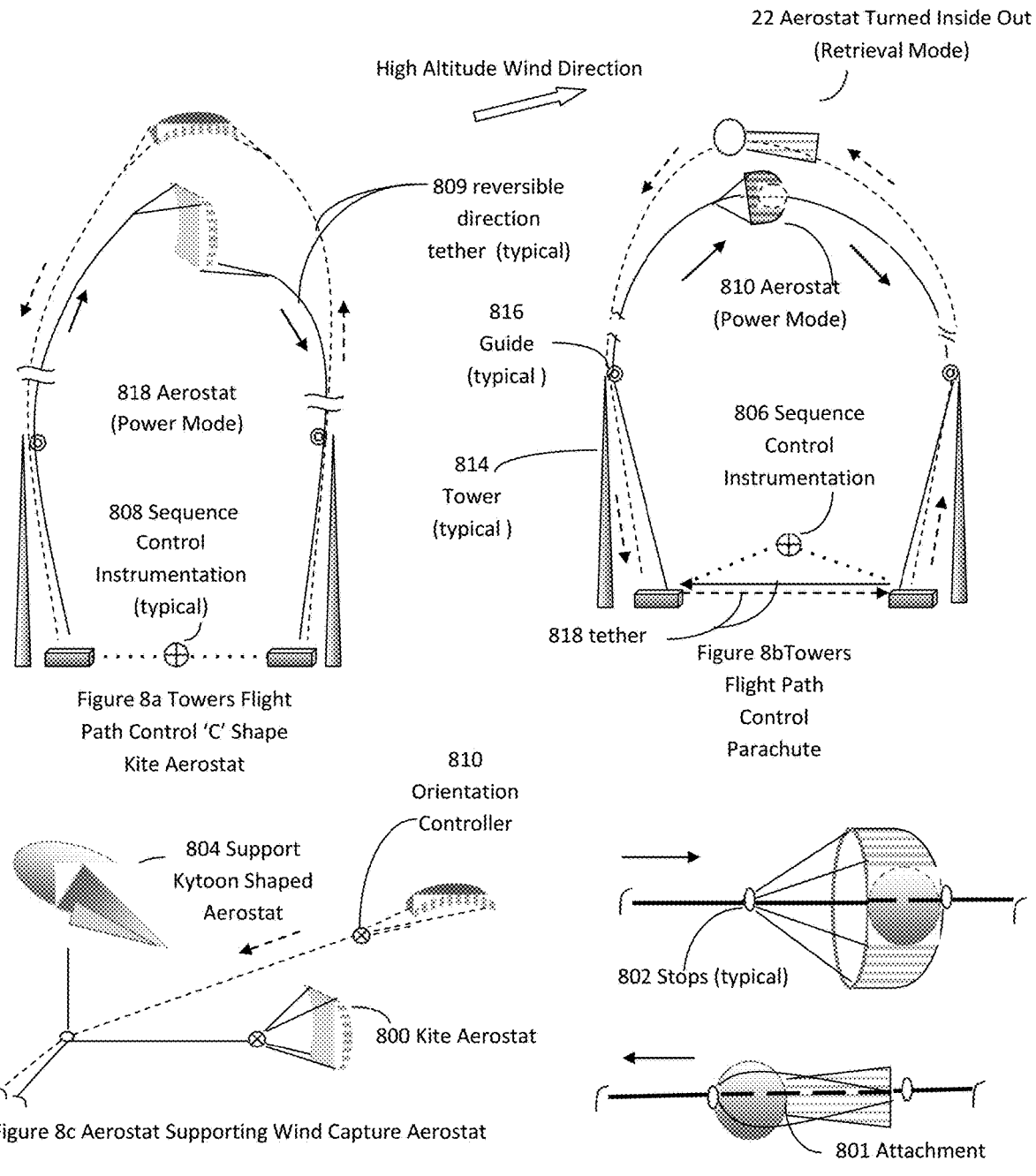
Figure 8 Linear Motion HAWE Capture Systems

INEXPENSIVE HYDROGEN FROM WIND AND WATER USING AEROSTATS AND ELECTROLYSIS

CROSS-REFERENCE TO RELATED APPLICATIONS

This application is related to, and claims the benefit of priority from, U.S. Provisional E Patent Application Ser. No. 62/501,583 filed May 4, 2017 the disclosure of which applications are incorporated herein by reference in their entirety.

STATEMENT REGARDING FEDERALLY SPONSORED RESEARCH OR DEVELOPMENT

Not Applicable

REFERENCE TO SEQUENCE LISTING

Not Applicable

SUMMARY OF INVENTION

Wind Energy Conversion Systems (WECS) combine aerostats with wind capture and auxiliary components connected to ground mounted generators and electrolysis of water to produce electrical power and hydrogen and oxygen.

BACKGROUND OF THE INVENTION

Significant challenges prevent conventional wind turbine (Horizontal Axis Wind Turbine (HAWT) derived power from replacing fossil fuels used for production of electricity and hydrogen from electrolysis of water. At the end of 2013 there were more U.S. wind power megawatts (MW) under construction than ever in history: Over 12,000 MW of new generating capacity was under construction, with a record-breaking 10,900 MW starting construction activity during the fourth quarter. The wind projects under construction could power the equivalent of 3.5 million American homes, or all the households in Iowa, Oklahoma and Kansas. (ref. http://www.awea.org/MediaCenter/pressrelease.aspx?ItemNumber=60440)

The majority of this growth has been in the form of conventional, horizontal-axis wind turbines (HAWT). Converting the kinetic energy of the wind into useful electricity requires converting the linear horizontal motion of wind into the rotational motion of a shaft in an electrical generator. In every case this requires some method of maintaining a static force against the motion of the wind, to keep the wind-collection apparatus from simply blowing away. Conventional wind turbines accomplish this by mounting rotors rigidly on towers, relatively close to the ground. This arrangement works reliably, but is relatively expensive, requires large amounts of structural material, hard to maintain and operate (due in large to the height of the generator), and cannot tap the much stronger winds often present at higher altitudes (ref. 2 http://en.wikipedia.org/wiki/Kite_enemy).

The key to making wind energy more efficient is to access high altitude wind. "Turbines in conventional machines are located at heights ranging from 100 m to 200 m; however, wind flow is more consistent and faster at altitudes above 500 m. Therefore, winds at this altitude could act as a reliable source of energy that can be harnessed using kites, buoyant turbines and sails. "High Altitude Wind Power (HAWP), has the potential to replace a high percentage of the power generated from fossil fuels and traditional Horizontal Axis Wind Turbines (HAWT)". (ref. http://www.modernpowersystems.com/news/newshigh-altitude-wind-power-generation-is-now-on-the-map-4795780.

Achieving these heights require close coordination with Federal, State and local authorities having jurisdiction of air space over land and water that may adversely effect air travel and public safety especially over urban areas over the United States and territorial waters. Current regulations are covered under Federal Aviation Administration (FAA) regulation PART 101—MOORED BALLOONS, KITES, AMATEUR ROCKETS AND UNMANNED FREE BALLOONS Subpart A—General Sec. 101.1 Applicability. 101.3 Waivers. 101.5 Operations in prohibited or restricted areas. 101.7 Hazardous operations. Subpart B—Moored Balloons and Kites 101.11 Applicability. 101.13 Operating limitations. 101.15 Notice requirements. 101.17 Lighting and marking requirements. 101.19 Rapid deflation device (ref. https://www.gpo.gov/fdss/pkg/CFR-2012-title14-vol2/pdf/CFR-2012-title14-vol2-part101.pdf) provides regulatory controls for aerostats over land and U.S. territorial oceans. Additional restrictions are recommended between outer space—which is not subject to national jurisdiction—and national airspace), with suggestions ranging from about 30 km (19 mi) (the extent of the highest aircraft and balloons) to about 160 km (99 mi) (the lowest extent of short-term stable orbits). The Fédération Aéronautique Internationale has established the Kármán line, at an altitude of 100 km (62 mi), as the boundary between the Earth's atmosphere and outer space, while the United States considers anyone who has flown above 50 miles (80 km) to be an astronaut; indeed descending space shuttles have flown closer than 80 km (50 mi) over other nations, such as Canada, without requesting permission first.[5] Nonetheless both the Kármán line and the U.S. definition are merely working benchmarks, without any real legal authority over matters of national sovereignty (ref. https://en.wikipedia.org/wiki/Airspace).

Eliminating rotating blades and related components will significantly lower the capital costs of HAWT and allow the generator to be located at ground level for ease of maintenance and operation. "An analysis recently published in *Windpower Endineering and Development* gives us a rough idea of how to cut capital costs of generating electricity from wind energy. While the report focuses on how improvements to drive trains can increase efficiency, it also breaks down the cost proportion of different parts of the turbine. The large metal components (tower, nacelle, and blades) account for nearly 80 percent of the cost of a typical turbine. Also, about 65 percent of the cost of an on-shore wind farm is the capital expense of the turbines themselves. That means the cost of wind energy is largely determined by the cost of these big castings."

In addition, eliminating the need of a power grid will allow a greater use of wind energy especially in areas remote from power transmission lines. "Even as China races ahead of other countries in terms of installed wind capacity, its turbines aren't producing electricity at the same rate because of inadequate transmission infrastructure. Even with more than double the installed capacity as the U.S., China generated only 241 TWh of wind power compared with 224 TWh, according to data from China's National Energy Administration and the U.S. Energy Information Administration showing generation over 12-months ending in the fourth quarter." (ref. http://www.renewableenergyworld.com/articles/2016/08.html.

BRIEF SUMMARY OF THE INVENTION

In the present invention, High Altitude Wind Power (HAWP) is captured and converted to electricity using combined aerostats and wind capture systems connected to ground mounted generators to produce electrical power. All or a portion of the electricity is fed to high pressure electrolytic cells to convert water to hydrogen and oxygen (ECHO). The hydrogen and oxygen is stored and distributed for direct use in fuel cell electric vehicles and the oxygen for medical quality breathing air. Heavy above ground HAWT components are replaced by light weight components requiring minimum maintenance. The ground mounted generator is easily accessible lowering operating and maintenance costs. The need for an electric grid is eliminated. The combined costs savings of eliminating the majority of HAWT capital costs combined with lower operating and maintenance costs of ground mounted generators, electrolysis of water under pressure eliminating the need for compressors, and sale of oxygen reduces the cost of hydrogen production significantly. When water is pressurized and then electrolysis is conducted at those high pressures, the produced hydrogen gas is pre-compressed at around 120-200 bar (1740-2900 psi).(ref. https://en.wikipedia.org/wiki/Water_splitting#cite_note-4) By pre-pressurizing the hydrogen in the electrolysis unit, energy is saved as the need for an external hydrogen compressor is often eliminated, the average energy consumption for internal compression is around 3% (ref. https://en.wikipedia.org/wiki/Water_splitting#cite_note-5). The energy required to compress water is very much less than that required to compress hydrogen gas.

Systems of the present invention include a variety of aerostats, linear and a rotational wind capture systems, light weight towers, ground mounted generators, electrolytic converters, and means for storing and distribution of hydrogen and oxygen.

The linear system combines an aerostat with a large area to depth profile connected by a tether to a windless on a ground mounted motor/generator. When the aerostat is oriented at a high angle of attack relative to wind direction, the force (WF) pushes the aerostat a distance (L) causing the motor/generator to spin and create power $P1 = (WF1) \ast (L)$. Upon reaching a preset distance the aerostat is repositioned to a low angle of attack to minimize drag and the motor/generator rotation is reversed by introducing electrical power to overcome drag force (WF2) along distance (L) loss of energy $P2 = (WF2) \ast L$ thereby reeling the aerostat back to its starting point. The net difference (P1) minus (P2) is the net gain in electrical power.

The second system combines an aerostat to support a rotating wind capture device. One wind capture device utilizes a belt with integral cells looped around a ground mounted generator shaft. The force of the wind causes the belt to orient the cells perpendicular causing the cells to open on the upwind side and to close on the downward side producing a net rotational force that is transmitted to the generator shaft causing it to spin and produce electricity. Still another wind capture device consists of an aerostat supporting a rotating finned paddle wheel connected to a ground mounted generator using looped tethers. The force of the wind causes the wheel and connected tethers and generator shaft to spin producing electricity.

Depending on site conditions, and especially areas requiring linear control of the aerostat flight path, new or modified existing towers can be used to advantage. One example is two towers each with a separate windless equipped generator that reciprocate a set distance between power and retrieval mode along a controlled flight path between the towers. Still another example is use of lighter, higher structures similar to radio towers, to support HAWP systems with or without aerostats and means for transmitting the energy to ground mounted generators.

Once the electricity is generated it can be rectified for onsite use, transmitted to a power grid or fed to an electrolysis cell to produce hydrogen and oxygen for storage, distribution and sale. The latter option provides a means for storing energy in the form of hydrogen and oxygen thereby eliminating the need for a power grid.

These systems overcome the problems of HAWP competing technologies including:

Kites with internal wind turbine (example ref.http://www.google.com/patents/US7656053) and Doughnut Shaped Aerostats (ref. example https://www.google.com/patents/US8100366) complexity and expense of safely maintaining heavy, low efficiency rotating blade, wind generator turbines at high elevations and conveying electricity to grade.

Kites with tethers to ground mounted generators (example ref. https://www.google.com/patents/US8100366D2) Instability of kites and related control and expense during no, and low wind velocity and rapid change of wind direction.

Laddermill kites (ref. www.google.com/patents/WO2008034421A2)—Complexity and costs related to controlling multiple C shaped kites in tandem (laddermill) at high elevations.

The present invention is designed to overcome problems and reduce capital, operating and maintenance resulting in reduced costs to produce hydrogen utilizing unique attributes including:

a. Taps into much more powerful and consistent high altitude winds leading to greater efficiency and reliability.
b. Utilizes light weight, durable, low maintenance materials above ground level.
c. Generator is at ground level for ease of maintenance and operation.
d. Heavy, expensive HAWT components including rotor blades, nacelle, yaw, tower are eliminated.
e. Eliminates need for power grid allowing use in remote areas.
f. Reduces land required for equivalent power output.
g. Bird kills from rotor blade are eliminated.
h. Compresses water prior to electrolysis to conserve energy and auxiliary optional compressors to increase pressure if required.
i. Allows use of electrical power to drive water pump systems to store in reservoirs at higher elevations for future energy production in hydroelectric generators.

Systems components, forms, designs, materials of construction will vary depending on economics, site conditions, regulatory codes, and proxcimity to power grids, populated areas, wind velocity and direction. For simplicity, many or all designs may be utilized in this concept along with a host of aerostat shapes and functions, lighter than air inflating gas, towers, belt, cells, pulleys, generators, tethers, controls, pulleys, sheaves, shafts servos, supports, rotating base, electrolytic cells, instrumentation and controls and components.

BRIEF DESCRIPTION OF THE SEVERAL VIEWS OF THE DRAWINGS

FIG. 3—Various systems utilizing aerostat based wind capture with ground mounted generators alone or with modified or new replacement towers to access wind currents.

FIG. 5—Details for tower mounted single wind capture belt assembly mounted on rotating base with shaft drive the length of the tower to a horizontal, ground mounted generator (5a), similar to (5a) except single wind capture belt with dampener, shaft drive (5b), dual split wind capture belts mounted on structural tower (5c) connected to a shaft linked to a horizontal ground mounted generator.

FIG. 6 details are similar to FIG. 5 except utilizing a variety of wind capture belts configurations and external belt along the length of the support structure in lieu of a shaft to a ground mounted generator. In addition FIG. 6a Single Wind Capture Belt with Structural Support Mounted to Column with Rotating Base, FIGS. 6b, and 6c, with single and dual wind capture belts, and FIG. 6d Continuous Wind Belt to Horizontal Generator on Rotating Base FIG. 7 Linear wind capture system comprising a C-Kite inflated aerostat, orientation controls, and tether to ground mounted generator whereby the aerostat is aligned at a high angle of attack to maximize energy generation during power mode and low angle of attack during retrieval mode to minimize the energy required to return the kite to its starting point.

FIG. 8 Controlled flight path of C-Kite and parachute shaped aerostats between two towers with tethers to ground mounted switchable generator/motor reversible drives to generate energy as described in FIG. 7 above and kite/balloon (kytoon) aerostat (ref. https://en.wikipedia.org/wiki/Kytoon) supporting a C-Kite aerostat capture device.

DETAILED DESCRIPTION OF THE INVENTION

In the following detailed description, reference is made to the accompanying drawings, in which are shown exemplary but non-limiting and non-exhaustive embodiments of the invention. These embodiments are described in sufficient detail to enable those having skill in the art to practice the invention, and it is understood that other embodiments may be used, and other changes may be made, without departing from the spirit or scope of the invention. The following detailed description is, therefore, not to be taken in a limiting sense, and the scope of the invention is defined only by the appended claims.

Figure 1:
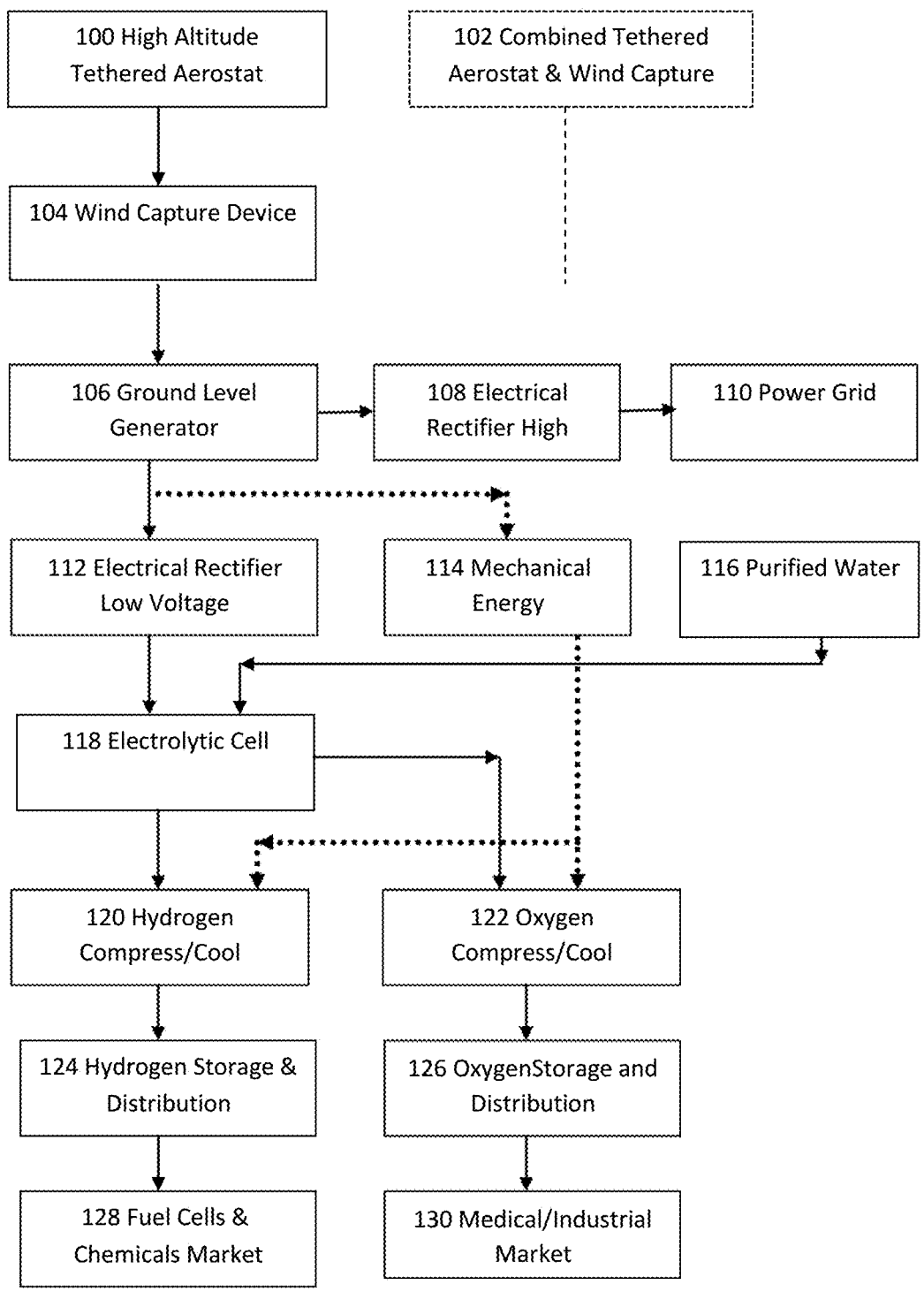
FIG. 1—Process flow block diagram high altitude wind capture and conversion to electrical and mechanical power for direct use or a portion used for electrolytic conversion of water to hydrogen and oxygen.

FIG. 1 is block diagram that describes the collection of high altitude wind using an aerostat 100 to support a wind capture device 104 or aerostat with integral wind capture 102 connected to a ground level generator 106 to produce electricity and mechanical energy 114. Mechanical energy is an alternate for electricity for compression of hydrogen and oxygen. Electrical power is routed to high voltage rectifier 108 and then to power grid 110. The remaining power is routed to low voltage rectifier 112 prior to forwarding to an electrolytic cell 118 wherein purified water 116 is compressed and converted to high pressure hydrogen (ref.https://en.wikipedia.org/wiki/Water_splitting#cite_note-4) and oxygen 120 and stored and distributed 124 for sale in fuel cells and chemicals production. Likewise, oxygen from electrolytic cell 118 is stored and distributed 126 for medical quality breathing air and other uses.

Figure 2:
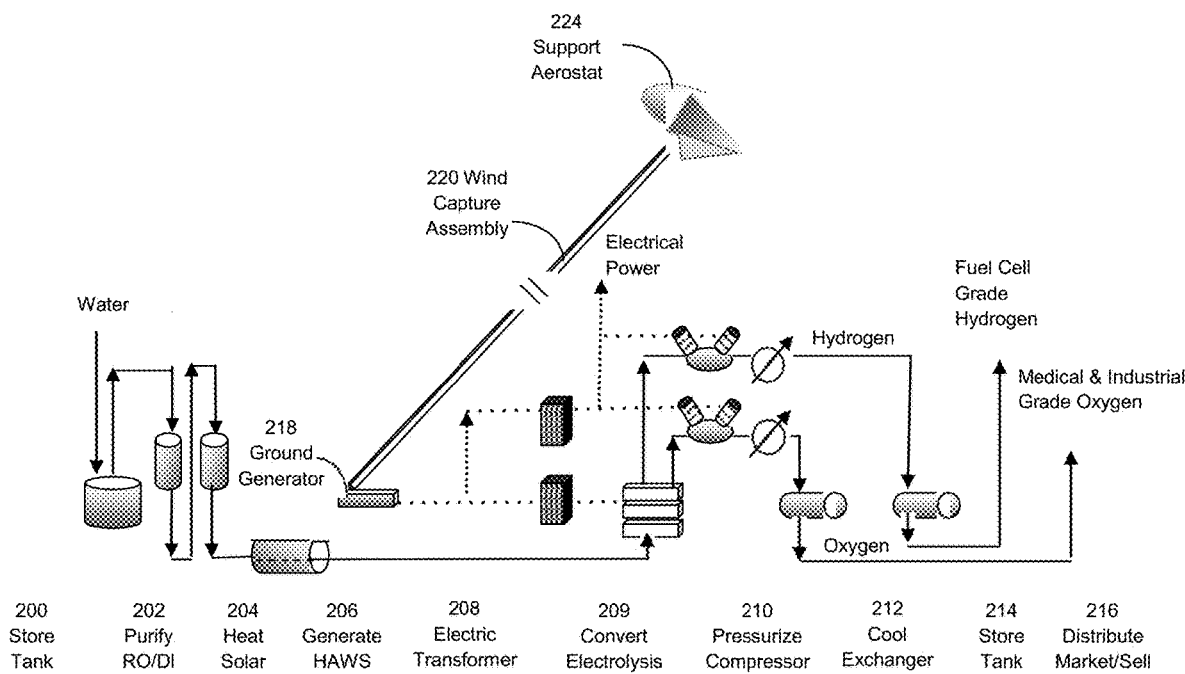
FIG. 2—Process schematic incorporating high altitude wind capture and electrolysis to produce fuel cell hydrogen and medical grade oxygen.

FIG. 2 is a flow diagram depicting capture of high altitude wind energy (HAWE) using a high altitude wind system (HAWS) to produce electricity, hydrogen and oxygen. Water from storage tank 200 is purified using reverse osmosis (RO) followed by de-ionized (DI) resin polishing columns to produce ultra low conductivity water that is preheated and pressurized in solar heat exchanger 204 prior to conversion to hydrogen and oxygen in electrolysis unit 209 utilizing electricity generated from high altitude wind energy generator 206. The hydrogen and oxygen may be further pressurized using compressors 210, cooled using heat exchangers 212, stored in tanks 214 prior to distribution 216 for sale.

Figure 4A:
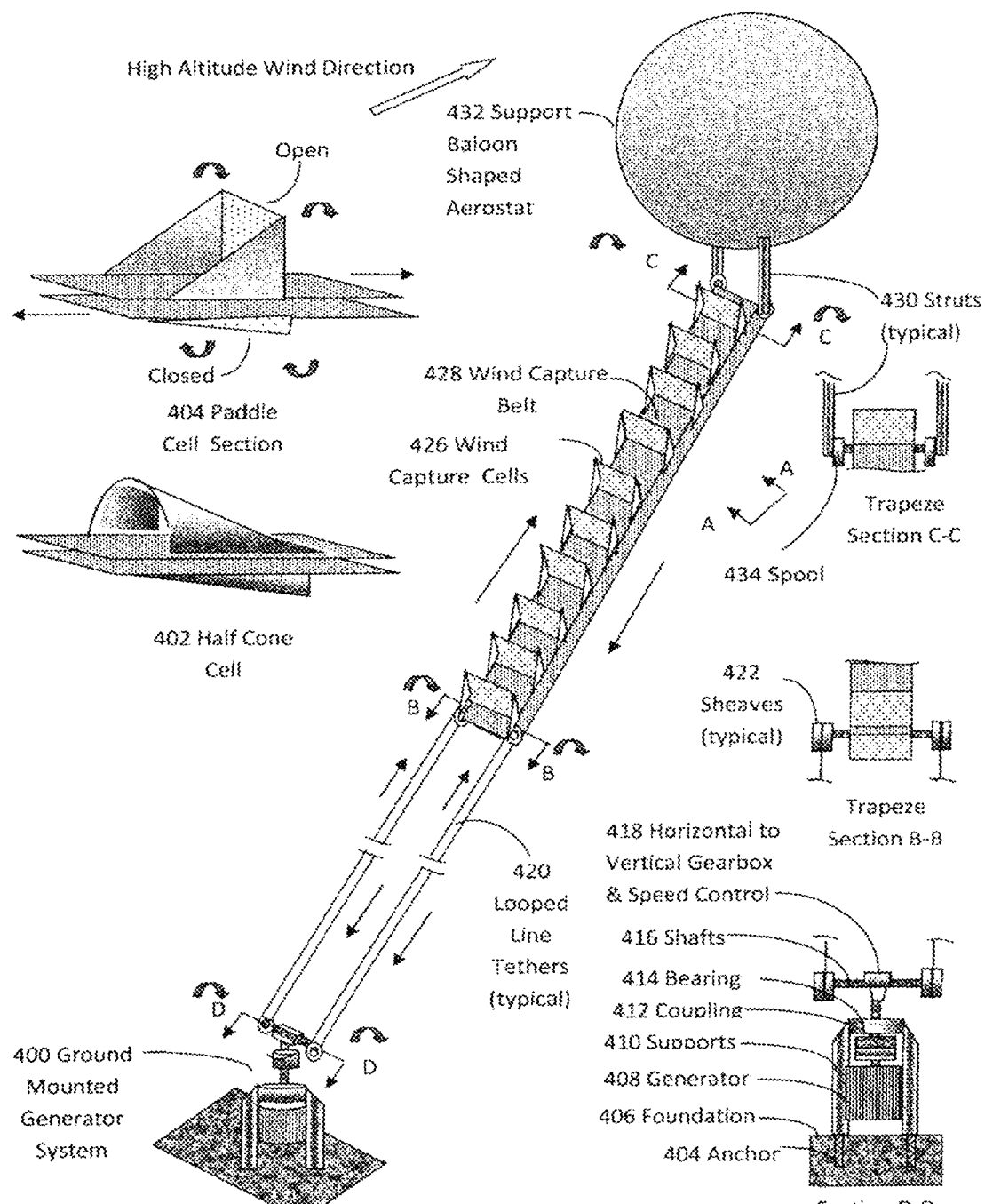
FIG. 4—Revolving motion energy capture utilizing an elevated aerostat supporting a belt with wind capture cells (4a) or rotating blades (4b) attached to a ground mounted generator to produce electrical and mechanical energy.
Figure 4B:
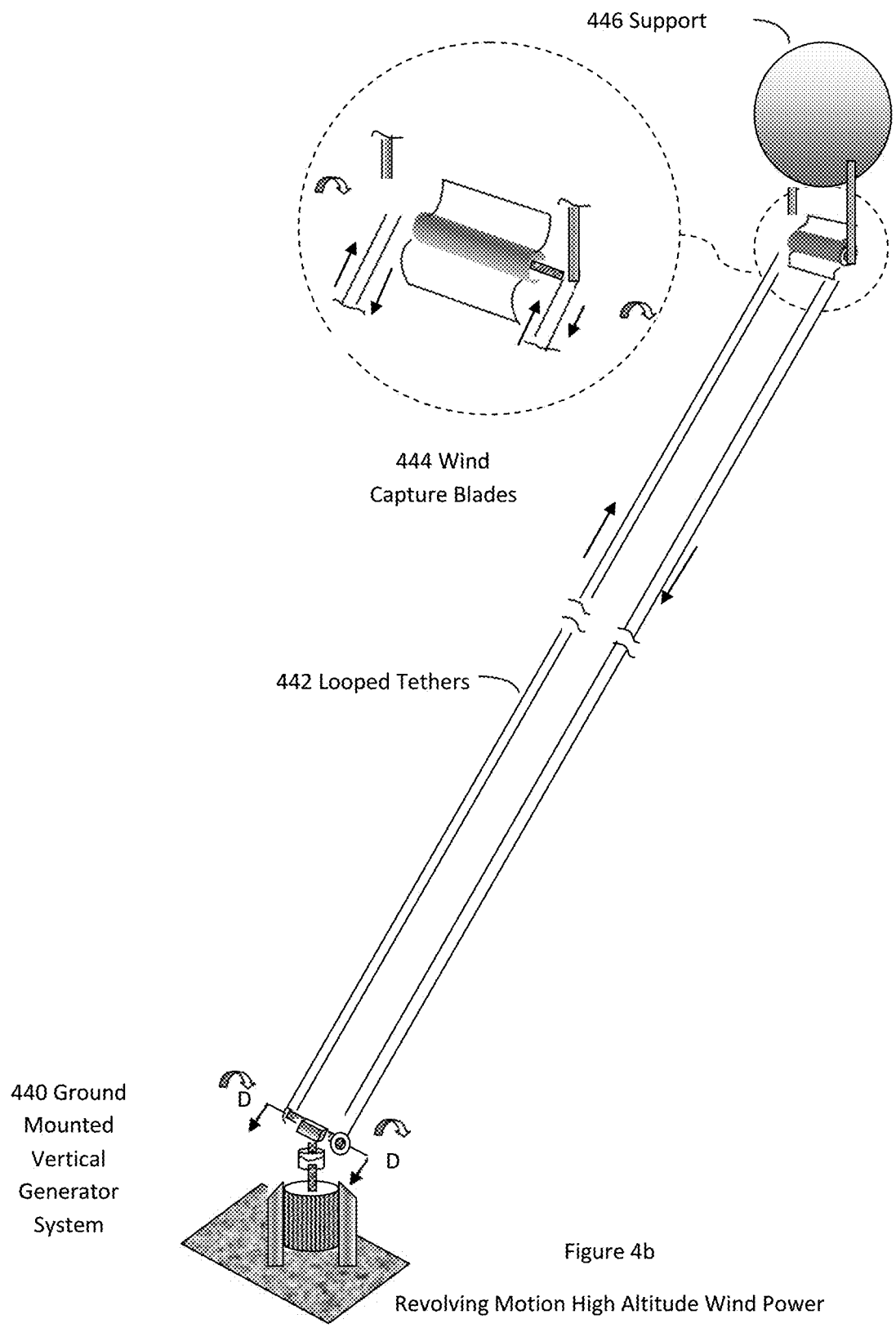

FIG. 3 Various Configurations to Access Greater Heights Compared to Typical HAWT provides comparisons of HAWT 302 with generator 300 relocated to ground 306 and rotor blades, nacelle, replaced with 304 wind belt with various configurations AWEC1-AWEC5 reaching heights to 5,000 feet (Note Current FAA restrictions restrict tethered aerostats to 500 feet and 2,000 feet in urban and rural areas (ref. https://www.gpo.gov/fdsys/pkg/CFR-2012-title14-vol2/pdf/CFR-2012-title14-vol2-part101.pdf). Offshore, FIG. 4 Revolving Motion High Altitude Wind Power Capture Systems Using Tethered Aerostat to Support Wind Capture Device is a schematic relating to FIG. 3, AWEC5 above. A spherical aerostat 432 with attached struts 430 supporting a spool 434 looped wind capture belt is connected to a ground mounted generator 408 through a combination of looped tethers 420, sheaves 422, shafts 416 spool 423, bearings 414, horizontal to vertical gearbox and speed control, coupling 412. The generator is supported by structural members 410 anchored 404 to a foundation 406. Two cell configurations are illustrated. The first 404 is an open flap with side restraints and the second is a closed half cone 402. In both configurations the cells open upwind and close downwind to generate a net energy increase that causes the belt 428, connected rotating elements and ultimately generator to spin and produce electricity.

FIG. 5 Details Additions and Modifications Conversion of HAWE to Wind Belt System Utilizing Shaft is a schematic of three configurations utilizing a tower in the form of a column or structural elements to which an aerostat supports a wind capture device as illustrated in FIG. 3 above for tower configurations AWEC1-AWEC3 and conveys wind energy to a horizontal ground mounted generator utilizing a shaft-down the interior length of the tower.

FIG. 5a Single Wind Capture Belt with Rotating Base depicts a continuous wind capture belt 538 supported by an aerostat mounted on a column connected to a ground mounted generator 514 through a combination of a spool 536, belt tether 534, horizontal to vertical gear box 532, support 530, rotating base 528, column 520, support bearing 524, vertical column shaft 522, horizontal to vertical gear speed control 518, foot bearing 515 connected to generator 514 through horizontal shaft 517, and coupling 516. The tower, generator and assembled components are supported by a foundation 506 and anchors 510.

FIG. 5b Single Wind Capture Belt Belt depicts an assembly similar to 5a above except the rotating base 528 and supports 530 are eliminated and base bearing 506 and dampen, tension control 504.

FIG. 5c Dual Split Wind Capture Belts depicts an assembly with two wind capture belts suspended from an aerostat by several spools on a structural member tower 502 with optional guy wires 500 that extend to anchors in the ground.

FIG. 6 Details Miscellaneous Additions and Modifications Utilizing Belts, Wind Capture Blades depicts details utilizing belts in place of shafts, continuous wind belt from support aerostat to ground mounted generator on rotating base, and aerostat with integral or support of wind capture blades tethered to ground mounted generator.

FIG. 6*a* Single Wind Capture Belt Exterior to Column depicts substituting a belt 600 for a shaft 522 in FIG. 5*a* above.

FIG. 6*b* substitutes a belt 602 for a shaft 540 depicted in detail 5*b*.

FIG. 6*c* substitutes a belt 604 for a shaft 542 depicted in detail 5*c*.

FIG. 6*e* substitutes an aerostat with integral wind capture blades 608 forwind capture belt 606 and support aerostat shown in FIG. 6*d*.

FIG. 6*f* substitutes a rotating wind blade 610 supported by an aerostat in place of the wind belt 606 shown in FIG. 6*d*.

Figure 7:
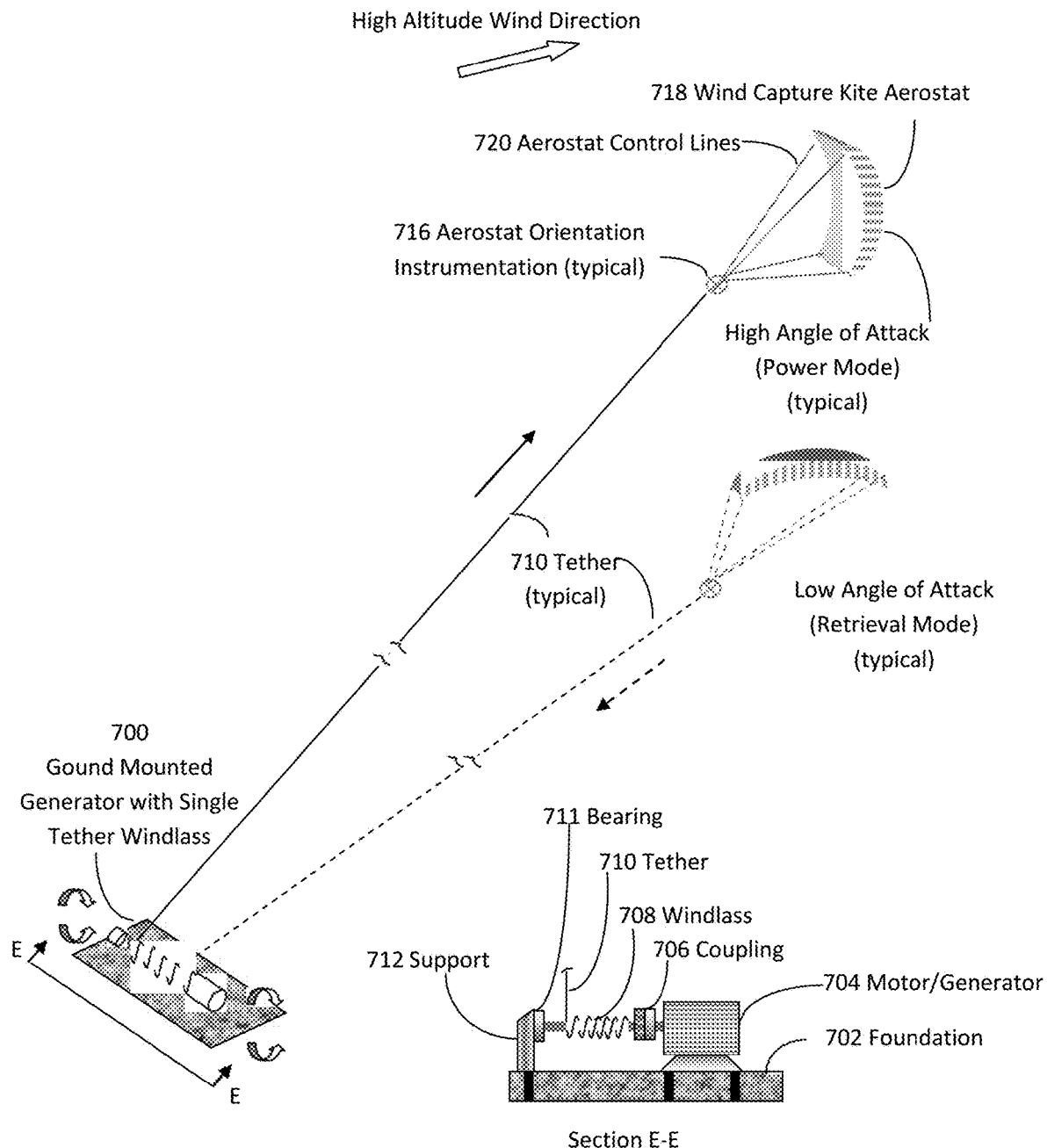

FIG. 7 Linear Motion HAWE Capture System Using Inflated Single C-Kite Aerostat depicts a wind capture system comprising a wind capture aerostat C-Kite 718, control lines 720, orientation instrumentation 716, ground mounted generator assembly 700 with component and attached parts support 712, bearing 711, tether 710 windlass 708, coupling 706 reversible motor generator 704, supported by foundation 702. When the Aerostat is at a high angle of attack wind force pushes the aerostat downwind a set distance before stopping and reorienting to a low angle of attack. Electricity is then supplied to generator and the shaft rotation is reversed and the attached windless 'reels-in' the tether onto the windless shaft and the process is repeated. The net electricity generated is the difference between the power and retrieval modes.

FIG. 8 Linear Motion HAWE Capture Systems depicts methods for controlled aerostat flight path between two towers and use of a kytoon (kite-balloon) shaped aerostat to support a C-Kite-shaped wind capture aerostat. FIG. 8*a* depicts a C-kite aerostat 824 between two towers 814 with guides 816 connected by tethers 830 to two ground mounted generators 820 with sequencing controller 808. The generator rotation is cycled clockwise and counterclockwise so as to limit the distance the aerostats travel and to orient the C-Kite at a high and low angle of attack as described in FIG. 7 above to generate a net gain in electricity.

FIG. 8*b* is similar to FIG. 8*a* except a parachute shaped aerostat shown in FIG. 8*c* opens upwind and closes downwind using mechanical stops 802 to generate electricity equal to the net difference of power versus retrieval mode. The generator rotation is cycled clockwise and counterclockwise so as to limit the distance the aerostats travel and to orient the C-Kite at a high and low angle of attack as described in FIG. 8*a* above to generate a net gain in electricity except the tether is extended between towers at ground level completing a loop with the above ground tethers and aerostat.

FIG. 8*c* depicts a kytoon (kite-balloon) shaped aerostat 804 supporting as C-Kite shaped aerostat 800 with orientation controller 810 in power and retrieval modes connected to a ground mounted motor/generator as described in FIG. 7 above.

| CROSS REFERENCE TO RELATED PATENTS | | | | |
|---|---|---|---|---|
| EP2463516A1 | Nov. 15, 2011 | Jun. 13, 2012 | Kite Gen Research S.R.L. | Aeolian system for converting energy through power wing airfoils |
| EP2642116A2 | Jun. 13, 2007 | Sep. 25, 2013 | Kite Gen Research S.R.L. | Wind system for converting energy through a vertical-axis turbine actuated by means of kites and process for producing electric energy through such system |
| EP2642117A2 | Jun. 13, 2007 | Sep. 25, 2013 | Kite Gen Research S.R.L. | Wind system for converting energy through a vertical-axis turbine actuated by means of kites and process for producing electric energy through such system |
| EP2642118A2 | Jun. 13, 2007 | Sep. 25, 2013 | Kite Gen Research S.R.L. | Wind system for converting energy through a vertical-axis turbine actuated by means of kites and process for producing electric energy through such system |
| EP2642119A2 | Jun. 13, 2007 | Sep. 25, 2013 | Kite Gen Research S.R.L. | Wind system for converting energy through a vertical-axis turbine actuated by means of kites and process for producing electric energy through such system |
| EP2682598A1 | Feb. 13, 2008 | Jan. 8, 2014 | Kite Gen Research S.R.L. | Wind energy converter using kites |

-continued

| | | | | |
|---|---|---|---|---|
| EP2682599A1 | Feb. 13, 2008 | Jan. 8, 2014 | Kite Gen Research S.R.L. | Wind energy converter using kites |
| EP2682600A1 | Feb. 13, 2008 | Jan. 8, 2014 | Kite Gen Research S.R.L. | Wind energy converter using kites |
| EP2685091A1 | Feb. 13, 2008 | Jan. 15, 2014 | Kite Gen Research S.R.L. | Wind energy converter using kites |
| | Feb. 13, 2008 | Jan. 15, 2014 | Kite Gen Research S.R.L. | Wind energy converter using kites |
| EP2698312A1* | Aug. 15, 2012 | Feb. 19, 2014 | KPS Limited | Energy extraction using a kite |
| WO2007144643A2 * | Jun. 15, 2007 | Dec. 21, 2007 | Kitetech Energy Systems Limited | Apparatus and method for extracting energy from the wind and improvements in or relating to lightening conductors |
| WO2007144643A3 * | Jun. 15, 2007 | Apr. 24, 2008 | Kitetech Energy Systems Ltd | Apparatus and method for extracting energy from the wind and improvements in or relating to lightening conductors |
| WO2009022979A2 * | Aug. 13, 2008 | Feb. 19, 2009 | Energy Potential Ab | A wind-power unit and a method for generating electrical energy |
| WO2009022979A3 * | Aug. 13, 2008 | Mar. 4, 2010 | Energy Potential Ab | A wind-power unit and a method for generating electrical energy |
| WO2009035492A1 * | Jul. 18, 2008 | Mar. 19, 2009 | Makani Power, Inc. | Bimodal kite system |
| WO2010017630A1 * | Aug. 11, 2009 | Feb. 18, 2010 | Moore James P | Variable air surface wind power generation |
| WO2011087541A3 * | Oct. 21, 2010 | Oct. 27, 2011 | Grant Calverley | Rotorcraft power-generation, control apparatus and method |
| WO2012146158A1 * | Apr. 23, 2012 | Nov. 1, 2012 | Luo Conggui | Reciprocating unloading and loading kite and kite-driving working mechanism thereof, power generation method, and vehicle or boat traveling method |
| WO2014087436A1 | Dec. 7, 2012 | Jun. 12, 2014 | Kite Gen Research S.R.L. | Wind energy conversion system with kites towing modules on a rail |
| WO2014140826A2 | Mar. 5, 2014 | Sep. 18, 2014 | Saudi Basic Industries Corporation | Renewable energy system for generating hydrogen and hydrogen products |

51. CLASSIFICATIONS

| | |
|---|---|
| U.S. Classification | 290/55 |
| International Classification | F03D5/00, H02P9/04, F03D9/00 |
| Cooperative Classification | F05B2240/921, Y02E10/70, F03D5/00 |
| European Classification | F03D5/00 |

The invention claimed is:

1. A high altitude wind apparatus for electrolytically generating hydrogen and oxygen comprising:
   a) an electrolytic cell for generating hydrogen and oxygen;
   b) a ground-mounted electric generator delivering electricity to the electrolytic cell; and
   c) a wind capture device comprising:
   i. a shaft with a pair of shaft sheaves on both ends, the shaft connecting to the generator for delivering rotational power;
   ii. a first spool with a first pair of spool sheaves on both ends;
   iii. a second spool with a second pair of spool sheaves on both ends;
   iv. a pair of looped tethers engaged with the pair of shaft sheaves and the first pair of spool sheaves, respectively;
   v. an aerostat connected to the second spool by a pair of struts; and
   vi. a wind capture belt comprising a plurality of wind capture cells, the belt engaged to the first spool and the second spool, wherein the plurality of wind capture cells are configured to open upwind and close downwind causing the belt to rotate, the first spool to spin and the apparatus to produce electricity.

2. The high altitude wind apparatus of claim 1, wherein the aerostat is a kytoon, C-Kite shaped or parachute shaped.

3. The high altitude wind apparatus of claim 1, wherein the plurality of wind capture cells are paddle cells or half cone cells.

4. A method comprising:
producing electricity from high altitude winds using the high altitude wind apparatus of claim 1; and
electrolytically generating hydrogen and oxygen powered by produced electricity from the high altitude wind apparatus.

* * * * *